(12) United States Patent
Chung et al.

(10) Patent No.: US 8,219,912 B2
(45) Date of Patent: Jul. 10, 2012

(54) SYSTEM AND METHOD FOR PRODUCING VIDEO MAP

(75) Inventors: Tae Sung Chung, Seoul (KR); Sung Pil Moon, Indianapolis, IN (US); Changhoon Lee, Seoul (KR); Sang Min Lee, Ulsan (KR); Dongkwan Kim, Gyeonggi-do (KR)

(73) Assignees: Tae Sung Chung, Seoul (KR); Compeprice LLC, Pittsburgh, PA (US)

( * ) Notice: Subject to any disclaimer, the term of this patent is extended or adjusted under 35 U.S.C. 154(b) by 848 days.

(21) Appl. No.: 12/258,709

(22) Filed: Oct. 27, 2008

(65) Prior Publication Data
US 2010/0077307 A1    Mar. 25, 2010

(30) Foreign Application Priority Data
Sep. 24, 2008    (KR) .................. 10-2008-0093762

(51) Int. Cl.
*G06F 3/00* (2006.01)
*G09F 5/00* (2006.01)

(52) U.S. Cl. ................ 715/721; 715/760; 345/661

(58) Field of Classification Search .............. 715/721, 715/760; 345/661
See application file for complete search history.

(56) References Cited

U.S. PATENT DOCUMENTS
2005/0210380 A1* 9/2005 Kramer et al. ............ 715/518
2009/0007178 A1* 1/2009 Artom ..................... 725/40
2009/0083260 A1* 3/2009 Artom et al. .............. 707/5
2009/0100456 A1* 4/2009 Hughes .................... 725/14

FOREIGN PATENT DOCUMENTS
| KR | 10-2002-0005174 A | 1/2002 |
| KR | 10-2006-0086658 A | 8/2006 |
| KR | 10-2006-0101421 A | 9/2006 |
| KR | 10-2008-0040063 A | 5/2008 |

OTHER PUBLICATIONS
International Search Report for PCT Application No. PCT/KR2009/005468 mailed May 10, 2010.

* cited by examiner

*Primary Examiner* — Boris Pesin
*Assistant Examiner* — Rinna Yi
(74) *Attorney, Agent, or Firm* — RatnerPrestia (57) ABSTRACT

Disclosed is a system and method for providing a moving picture map, the system including: a moving picture upload part for uploading moving pictures for one or more objects; and a map provision part for forming a moving picture map showing relations to other moving pictures according to subject matters, based on indexes corresponding to the moving pictures, and providing the moving picture map to a user interface for a moving picture search. Therefore, a user can be allowed to easily retrieve a number of moving pictures, and a manual and a review about a predetermined product can be made in a moving picture format for provision of the moving picture containing the manual and the review to consumers.

23 Claims, 8 Drawing Sheets

SYSTEM AND METHOD FOR PRODUCING VIDEO MAP

TECHNICAL FIELD

The present invention relates to a system and method for providing a moving picture map, and more particularly to a system and method for providing a moving picture map, which enables a user to easily find moving pictures of desired subject matter by classifying moving pictures according to subject matter and then spreading out the classified moving pictures on a screen in the form of a map.

BACKGROUND ART

With the advent of the Internet and the popularization of online shopping, increased importance is being attached to sharing review information about a corresponding product. In particular, in the case of an electronic product, product sales itself may vary according to review information about the product, and online shopping customers who are not in a position to personally see and test a product have no choice but to rely on the review information about it.

At present, such review information is serviced online, based on texts and pictures. In addition, product review services based on moving pictures have also recently been provided.

The text-based product review is given in the form of replies made by users or expert groups. However, it has a problem in that merits and faults of a product are very subjectively explained and are difficult to instinctively understand, so that objective evaluation on the product is ambiguous. Also, it is inevitable for the text-based review to have limitations in describing an operation method, a response speed, a working environment, etc. of a product that is actually operating, as in the case of an electronic product.

Further, the conventional moving picture review is more useful than the text-based review in that it can solve some of problems with the text-based review by showing a process of actually operating a product.

However, since general moving picture review sites employ a scheme in which an expert commentator produces and uploads one moving picture review for each product, they have limitations in providing various moving picture reviews about all products. Additionally, most moving picture reviews are nothing but simple comments on the appearance and some new functions of a product because they have limited time duration, and are produced by the staff, the number of which is considerably smaller than that of products.

Contrarily, some users upload and share UCC-based moving picture reviews descriptive of products that they are using in person, thereby providing necessary information to other users. Therefore, the UCC-based moving picture reviews are advantageous in that various users provide different moving picture reviews for one product, so that diversity can be ensured and much more information can be provided.

However, the UCC-based moving picture reviews have a problem in that it is not easy for general users to have access to information. For example, when a user searches for moving pictures by inputting the keyword "iPhone review" in a moving picture search site, hundreds of moving pictures are retrieved. If the user wants reviews about an e-mail function of the iPhone, it is never easy to specify which of the retrieved moving pictures corresponds to one desired by the user.

Moreover, since each user providing a moving picture approaches product reviews in a different scheme or from a different point of view, there is a difference in reliability between information providers. Furthermore, evaluation on the reliability is not provided in the conventional moving picture services.

Accordingly, in view of such problems, there is a need for a new scheme for moving picture search or product review.

DISCLOSURE

Technical Problem

Therefore, the present invention has been made in view of the above-mentioned problems, and the present invention provides a system and method for providing a moving picture map, which enables a user to easily find moving pictures of desired subject matter by classifying the moving pictures according to subject matters and spreading out the classified moving pictures on a screen in the form of a map.

Technical Solution

In accordance with an aspect of the present invention, there is provided a system for providing a moving picture map, the system including: a moving picture upload part for uploading moving pictures for one or more objects; and a map provision part for forming a moving picture map showing relations to other moving pictures according to subject matters, based on indexes corresponding to the moving pictures, and providing the moving picture map to a user interface for a moving picture search.

In accordance with another aspect of the present invention, there is provided a server for providing a moving picture map, the server including: a reception unit for receiving uploaded moving pictures for one or more objects; a storage unit for storing the moving pictures; a map forming unit for forming a moving picture map showing relations to other moving pictures according to subject matters, based on indexes of the moving pictures; and a user interface unit for providing the moving picture map to a user interface for a moving picture search.

In accordance with another aspect of the present invention, there is provided a system for uploading moving pictures, the system including: a monitor unit for displaying a moving picture map formed by collecting a first moving picture for one or more objects; a moving picture producing unit for responding to a request for provision of a moving picture displayed on the monitor unit, or forming a second moving picture according to optional production and execution of a user; and an upload unit for uploading the second moving picture onto a server for providing a moving picture map to update the moving picture map.

Preferably, the system further includes a user computer unit for producing and uploading the second moving picture in an individual zone of the user.

In accordance with another aspect of the present invention, there is provided a method for providing a moving picture map, the method including the steps of: uploading moving pictures for one or more objects; forming a moving picture map showing relations to other moving pictures according to subject matters, based on indexes corresponding to the moving pictures; and providing the moving picture map to a user interface for a moving picture search.

Preferably, the method further includes a step of updating the moving picture map either by updating other moving pictures, or by correcting the moving picture map.

Advantageous Effects

According to the present invention, it is possible for a user to easily retrieve a number of moving pictures by classifying moving pictures according to subject matters and spreading out the classified moving picture on a screen so as to allow the user to easily find a moving picture of desired subject matter. It is also possible to produce a manual and a review for a predetermined product in a moving picture format and thus very usefully provide the moving picture to consumers.

BRIEF DESCRIPTION OF THE DRAWINGS

The foregoing and other objects, features and advantages of the present invention will become more apparent from the following detailed description when taken in conjunction with the accompanying drawings in which.

BEST MODE

Mode for Invention

Hereinafter, exemplary embodiments of the present invention will be described with reference to the accompanying drawings.

Figure 1:
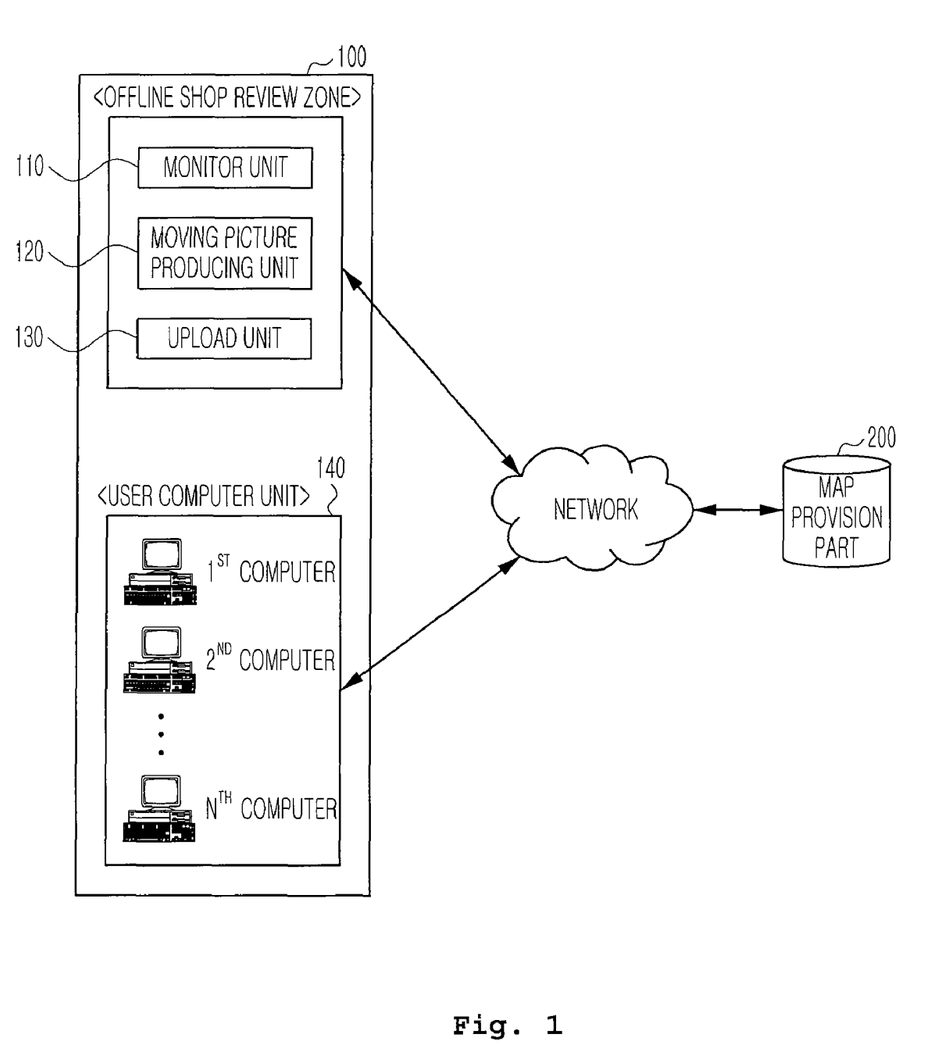
FIG. 1 is a block diagram illustrating a system for providing a moving picture map according to an embodiment of the present invention.

FIG. 1 is a block diagram illustrating a system for providing a moving picture map according to an embodiment of the present invention. As shown as an example in FIG. 1, the system for providing the moving picture map includes a moving picture upload part 100 for uploading moving pictures such as a review or a manual related to at least one object (e.g. a camera), and a map provision part 200 for forming a moving picture map (e.g. a map implemented through a tree structure) for showing relations to opened other moving pictures according to subject matters, based on indexes (e.g. subject matters related to a use method of a specific function of a camera, and subject matters related to a product review for the camera) that are provided in accordance with the uploaded moving pictures, and providing the moving picture map to a user interface for a moving picture search.

In the following description of the present invention, the object targeted by the present invention is assumed to be a camera.

Also, the moving picture map can be implemented either by collecting various moving pictures about a camera of a specific model from among various cameras, or by collecting moving pictures about product comparison that compares merits and faults between various models.

Therefore, the moving pictures necessary to constitute the moving picture map include either object information that contains the contents of a review that shows merits and faults of a camera, or a manual that describes the camera according to each of main functions, or object comparison information formed through comparison between two or more cameras.

Figure 2:
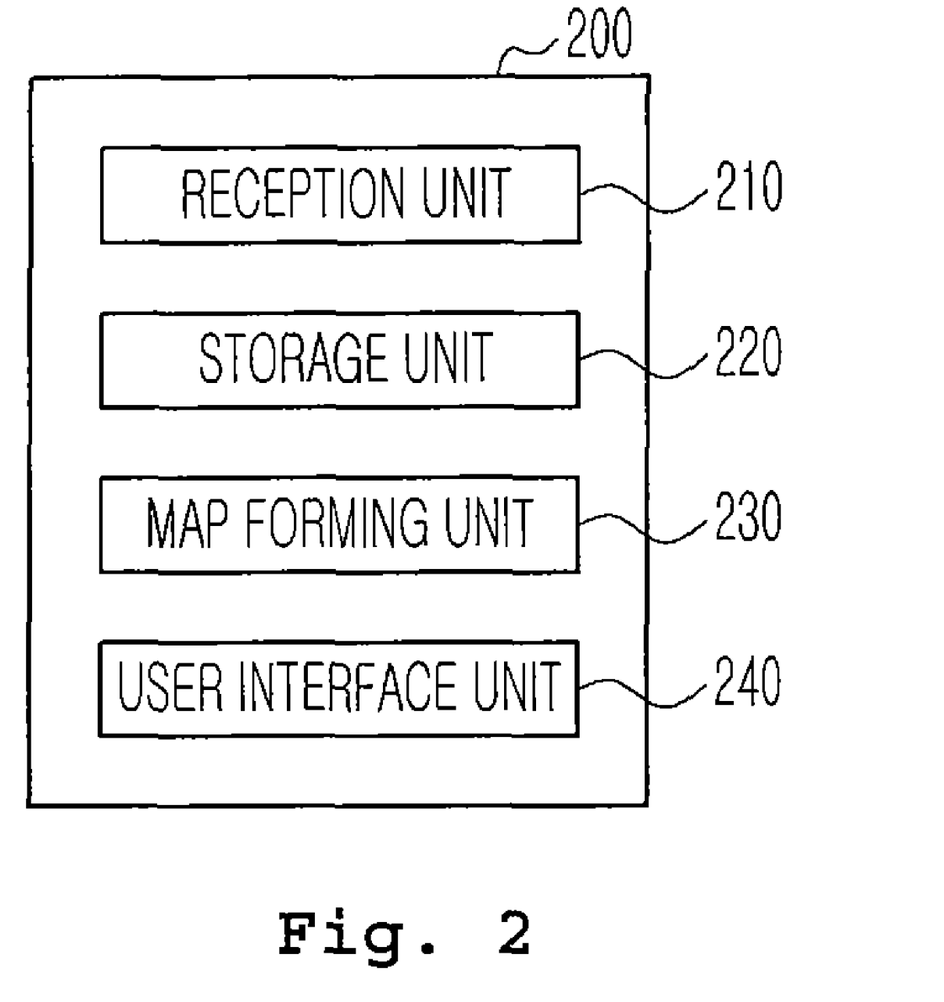
FIG. 2 is a detailed block diagram illustrating a map provision part shown in FIG. 1.

FIG. 2 is a detailed block diagram illustrating a map provision part 200 shown in FIG. 1. As shown as an example in FIG. 2, a server for providing a moving picture map in the map provision part 200 includes a reception unit 210 for receiving moving pictures about a camera of a specific model, a storage unit 220 for storing received moving pictures, a map forming unit 230 for receiving moving pictures, and forming a moving picture map by distinguishing relations to other moving pictures according to subject matters, having been already stored, based on indexes that are received together with the moving pictures to show subject matters of the moving pictures, and a user interface unit 240 for providing the formed moving picture map to a web or a wap page opened as a service for user's search of moving pictures.

The map forming unit 230 can not only form a moving picture map for sharing a manual or the contents of a review for each of various functions that a camera of a specific model incorporates, but also receive moving pictures used for comparing various types of cameras to form a moving picture map based on the received moving pictures.

In particular, the map forming unit 230 allows any one user to specify a specific part of the moving picture map, and then sets the specified part, which is specified by user's input through a menu (e.g. user's input for a menu named 'moving picture addition' activated by clicking a right button of a mouse connected to a computer), as an upload area.

Herein, according to a scheme of handling a moving picture map by a user, as mentioned above, it is possible to handle the moving picture map through the mouse of the computer. It is also possible to handle the moving picture map through user's touch input to a touch screen monitor on which a moving picture map is displayed. Additionally, it is possible to employ various input schemes together with the above-described input schemes.

Therefore, it is preferred that when a map node for any one user has sub-nodes in the moving picture map specified by the set upload area (e.g. a case where there is no sub-moving picture subject matter subordinate to subject matter of the moving picture constituting the map node of the user), the map forming unit 230 sets an automatically added moving picture to have an index identical to that of the subject matter of the moving picture constituting the map node.

Meanwhile, it is preferred that when a map node for any one user has no sub-node in the moving picture map specified by the set upload area (e.g. a case where sub-moving picture subject matter subordinate to the subject matter of the moving picture constituting the map node of the user is connected to a map node), the map forming unit 230 sets an index of an added moving picture by direct input of the user.

Figure 3:
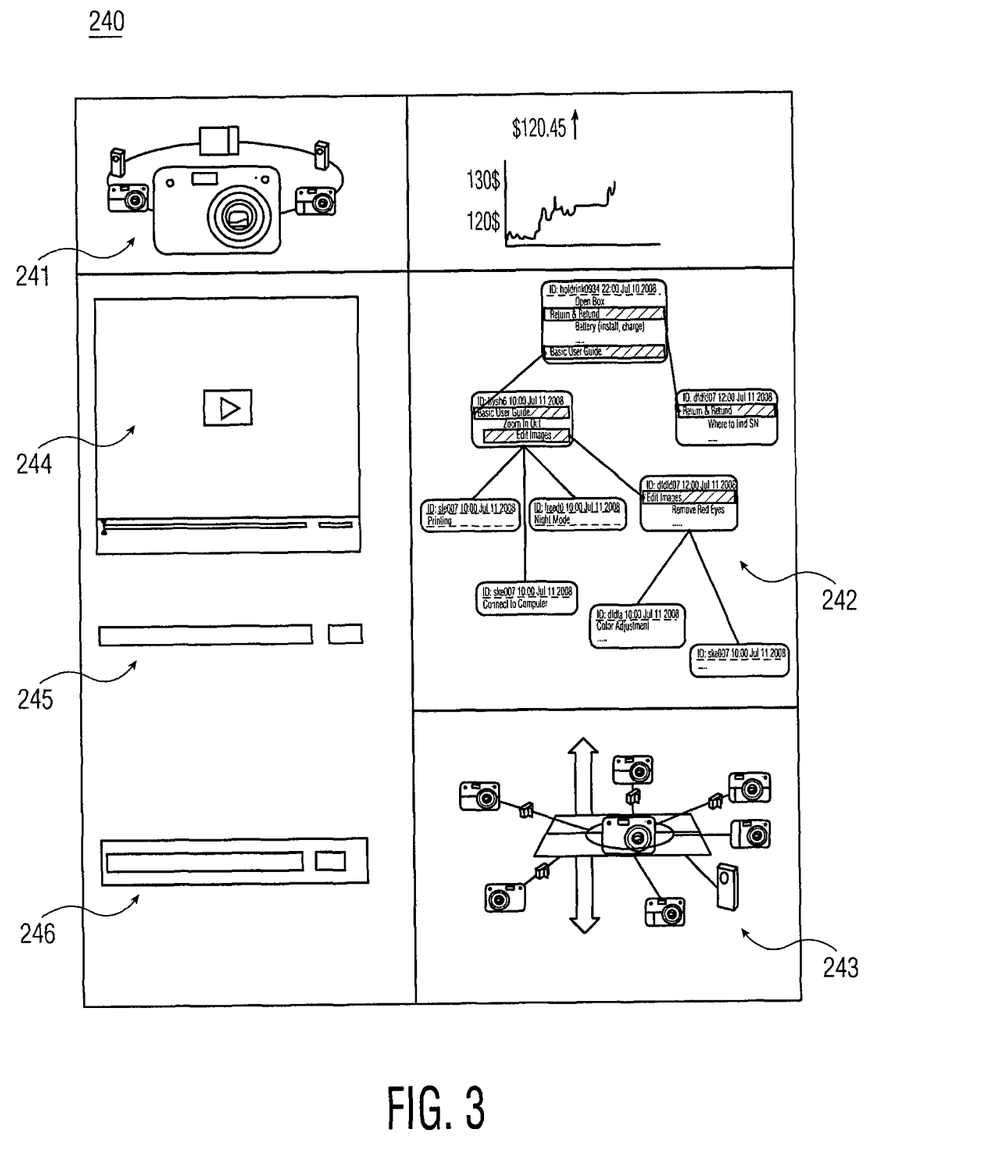
FIG. 3 is a block diagram illustrating a user interface formed through a server for providing a moving picture map, being a map provision part, shown in FIG. 2.

FIG. 3 is a block diagram illustrating a user interface formed through the server for providing the moving picture map, being a map provision part 200, shown in FIG. 2. As shown as an example in FIG. 3, the user interface unit 240 of the server for providing the moving picture map includes an object specification module 241 for specifying a camera of a specific model among cameras of various models to retrieve a moving picture for the manual of a specific function or a moving picture for the contents of a review about the specified camera through a moving picture map, and a map display module for displaying a moving picture map for a specific camera on a web or wap page screen.

Moreover, preferably, the user interface unit 240 further includes an object comparison module 243 for comparing two or more cameras, a moving picture display module for displaying a moving picture corresponding to a selected index when a user selects any one index in a moving picture map, an object evaluation module 245 for showing evaluation of a moving picture identified by a user, and a moving picture request module 246 for requesting a moving picture when a user's search result of a moving picture map shows that there are no desired moving pictures.

Herein, the moving picture request module 246 may include a function of enabling a user to add a reply or a comment such as, "A review has been made,", in response to a request such as "Review a display window of camcorder (Canon X-00), please."

Meanwhile, the moving picture request module 246 may include a function of adding a request of another user such as, "How many pixels are available in the display? (ID: applelover100), in response to the request such as, "Review a display window of camcorder (Canon X-00), please."

The moving picture request module 246 can also add a reply such as, "We don't carry Insignia products" or "We will have Insignia NS-LCD42HD 42" LCD Televisions after two weeks, after which its review is possible, in response to a request such as, "Review an Insignia NS-LCD42HD 42" LCD Television, please."

Figure 4:
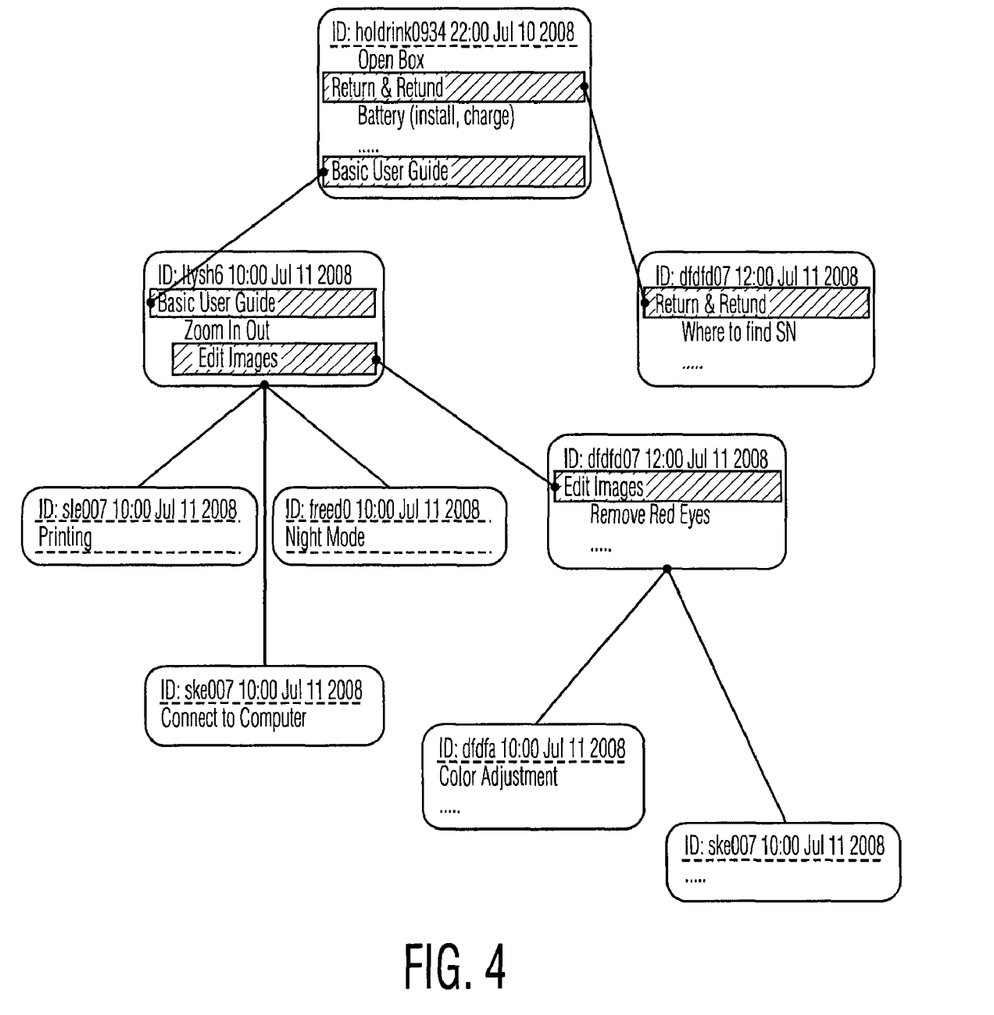
FIG. 4 is an enlarged view illustrating a section of a moving picture map in the user interface shown in FIG. 3.

FIG. 4 is an enlarged view illustrating a section of a moving picture map in the user interface shown in FIG. 3. As shown as an example in FIG. 4, the moving picture map can be organized in a tree structure, and can be implemented by more various structures in which a map is made. The moving picture map has a hierarchical structure in which moving pictures are classified according to IDs of users, and then the classified moving pictures are correlated by a horizontal line according to subject matters and if present, moving pictures forming sub-moving picture subject matter subordinate to any subject matter are linked to the moving picture forming the subject matter through a vertical line.

Figure 5:
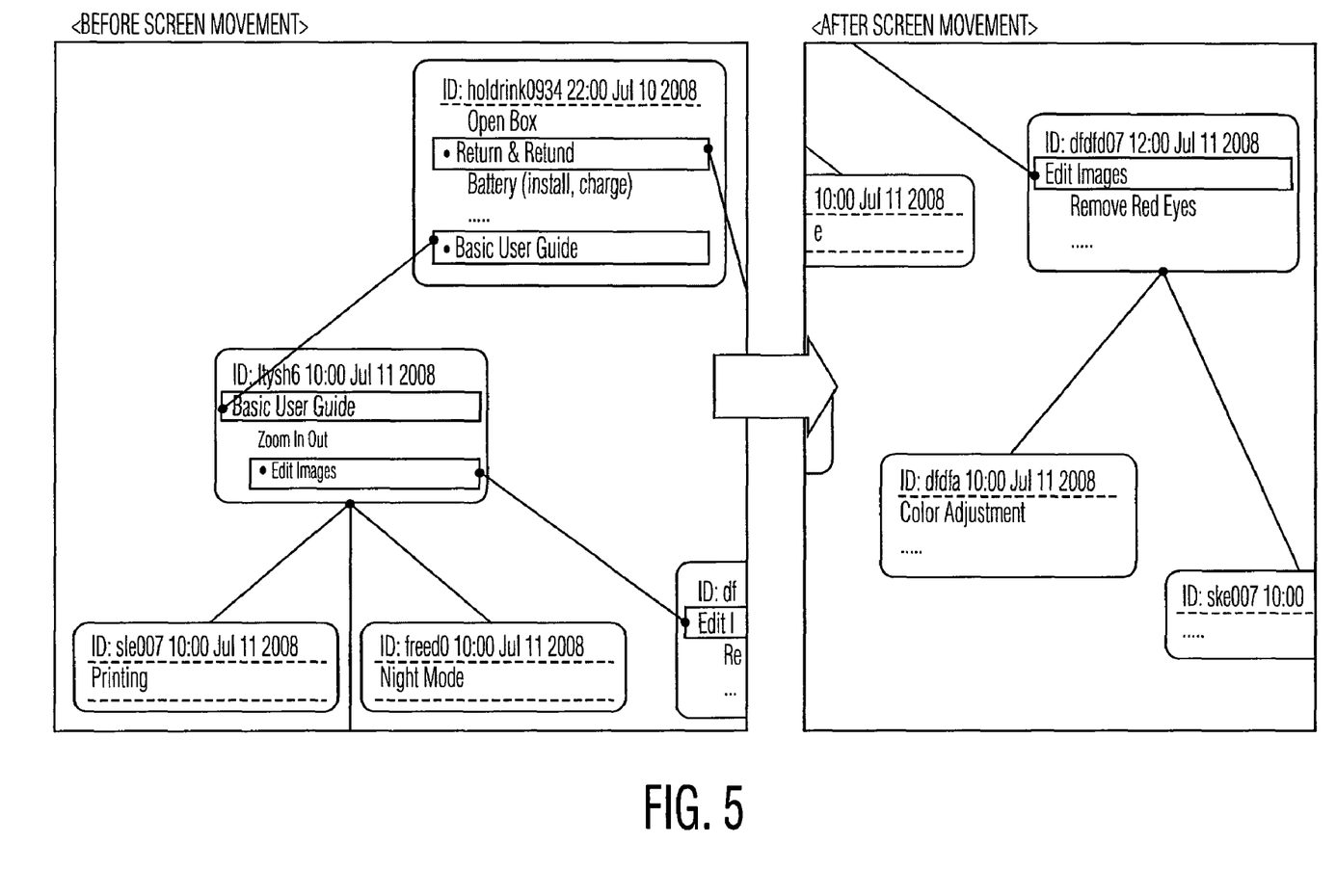
FIG. 5 is a view illustrating a screen movement for the moving picture map shown in FIG. 4.

Further, the map display module can move a screen for a moving picture map according to the user's control of the screen, as shown in FIG. 5. Such a function is aimed at accessing the entire moving picture map through the screen movement of the user since there is a limit to view all moving pictures on one screen in the presence of a large number of moving pictures.

Herein, the user's control of the screen makes it possible not only to move a screen as described above, but also to enlarge or reduce a screen, or to shift a screen in two or three dimensions as well.

Another function of functions similar to this is to retrieve an index corresponding to a keyword that a user inputs in a moving picture map. By the function, it is possible for the user to easily retrieve a desired moving picture without the screen movement.

The map display module has another function of allowing not only a user uploading a corresponding moving picture, but also another user to perform editing such as deletion of the corresponding moving picture when any one of moving pictures constituting the moving picture map satisfies a pre-set condition for sharing editing.

Herein, the condition for sharing editing can be set in various ways. Some examples of the conditions may include a case where users evaluate moving pictures at a level lower than a scheduled level, a case where any other user uploads a moving picture superior to the current moving picture, a case where any other user integrates and uploads several subject matters into one moving picture, and a case where an integrated moving picture for several subject matters is divided, and then the divided moving picture is respectively uploaded.

Further, the map display module can manage indexes according to each of specific subject matter shown on the moving picture map, and can also manage indexes by allowing users to optionally change subject matter. Preferably, this is implemented in a properly mixed form according to levels of moving picture maps.

Figure 6:
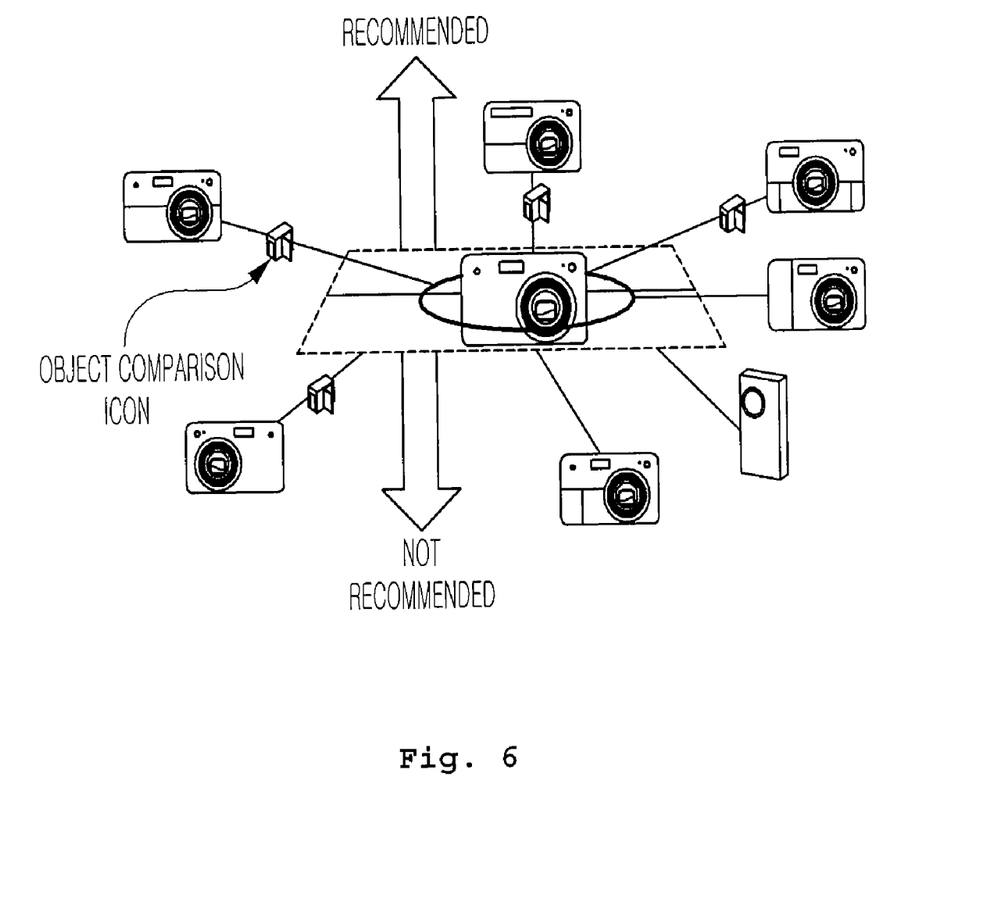
FIG. 6 is an enlarged view illustrating a section of object comparison in the user interface shown in FIG. 3.
Figure 7:
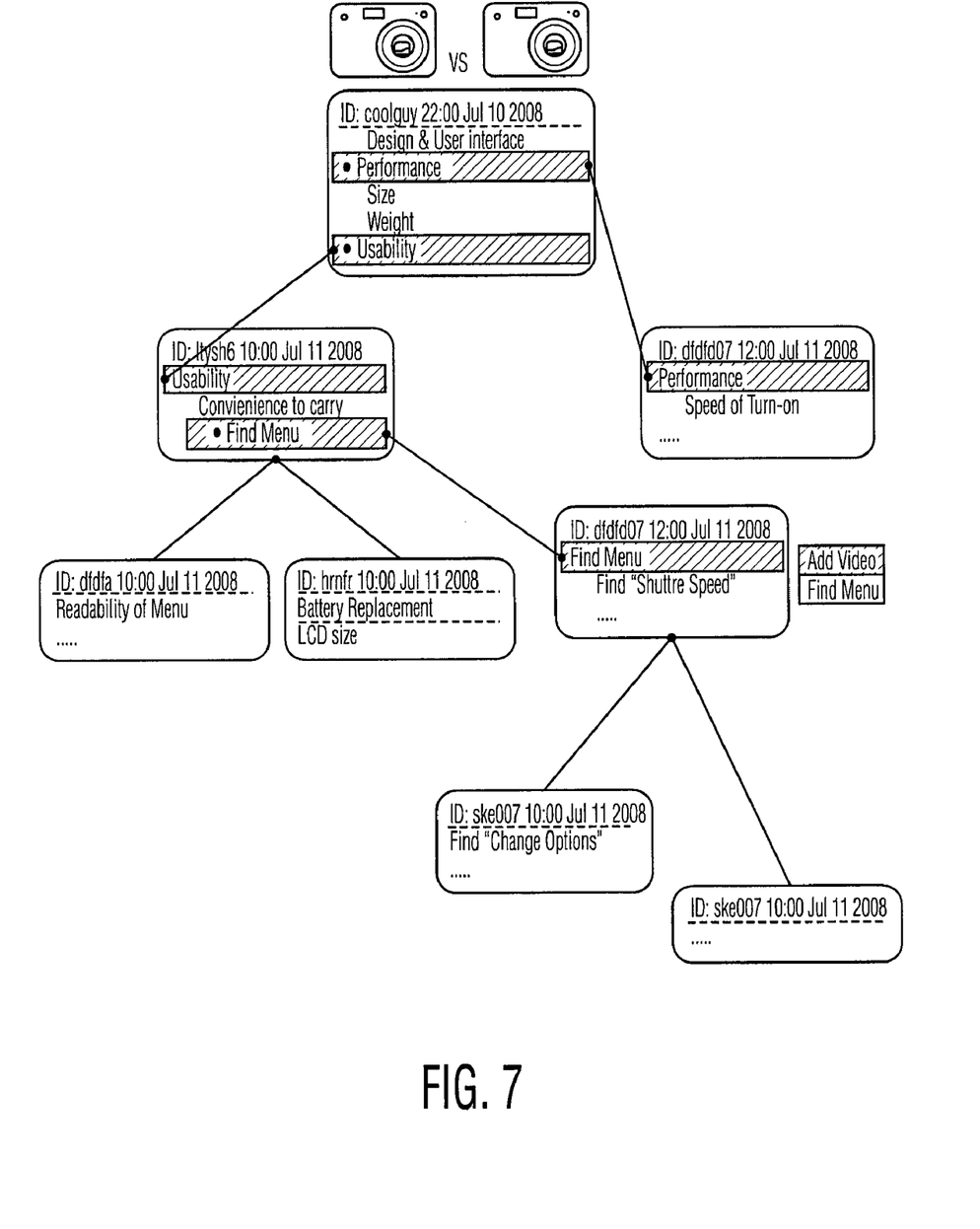
FIG. 7 is a view illustrating a moving picture map opened out in the case of selecting an object comparison icon in the object comparison screen shown in FIG. 6.

FIG. 6 is an enlarged view illustrating a section of an object comparison in the user interface shown in FIG. 3. As shown as an example in FIG. 6, the object comparison module 243 allows a user to select cameras being targets of comparison from among cameras of various models, and provides the moving picture map showing product comparison between the selected cameras to the map display module 242 for displaying them, as shown in FIG. 7.

Herein, specifying cameras, being targets of comparison, can be implemented by selecting an object comparison icon for a corresponding object in the user interface showing the object comparison module 243. Preferably, the object comparison icon is implemented such that it is not made when no comparison moving picture for a camera of a specific model exists on the moving picture map.

Meanwhile, the moving picture upload part 100 shown in FIG. 1 can be implemented either through a separate space named an offline shop review zone that publicizes or sells cameras offline, or through an individual computer of each user.

Herein, when a system including the moving picture upload part 100 is implemented through a space named an offline shop review zone, the system includes a monitor unit 110 for displaying a moving picture map formed by collecting a first moving picture for a camera of a specific model, a moving picture producing unit 120 for forming a second moving picture that a user produces in response to a request for provision of a moving picture, made on the monitor unit 110 by another user using the moving picture map, or forming a second moving picture according to optional production and execution in an offline shop review zone, and an upload unit 130 for uploading the produced second moving picture on the server for providing the moving picture map to update a corresponding moving picture map.

Further, when the system including the moving picture upload part 100 is implemented such that it is possible to receive the second moving picture through an individual computer of each user, the system may further include a user computer unit 140 with individual computers of each user.

Figure 8:
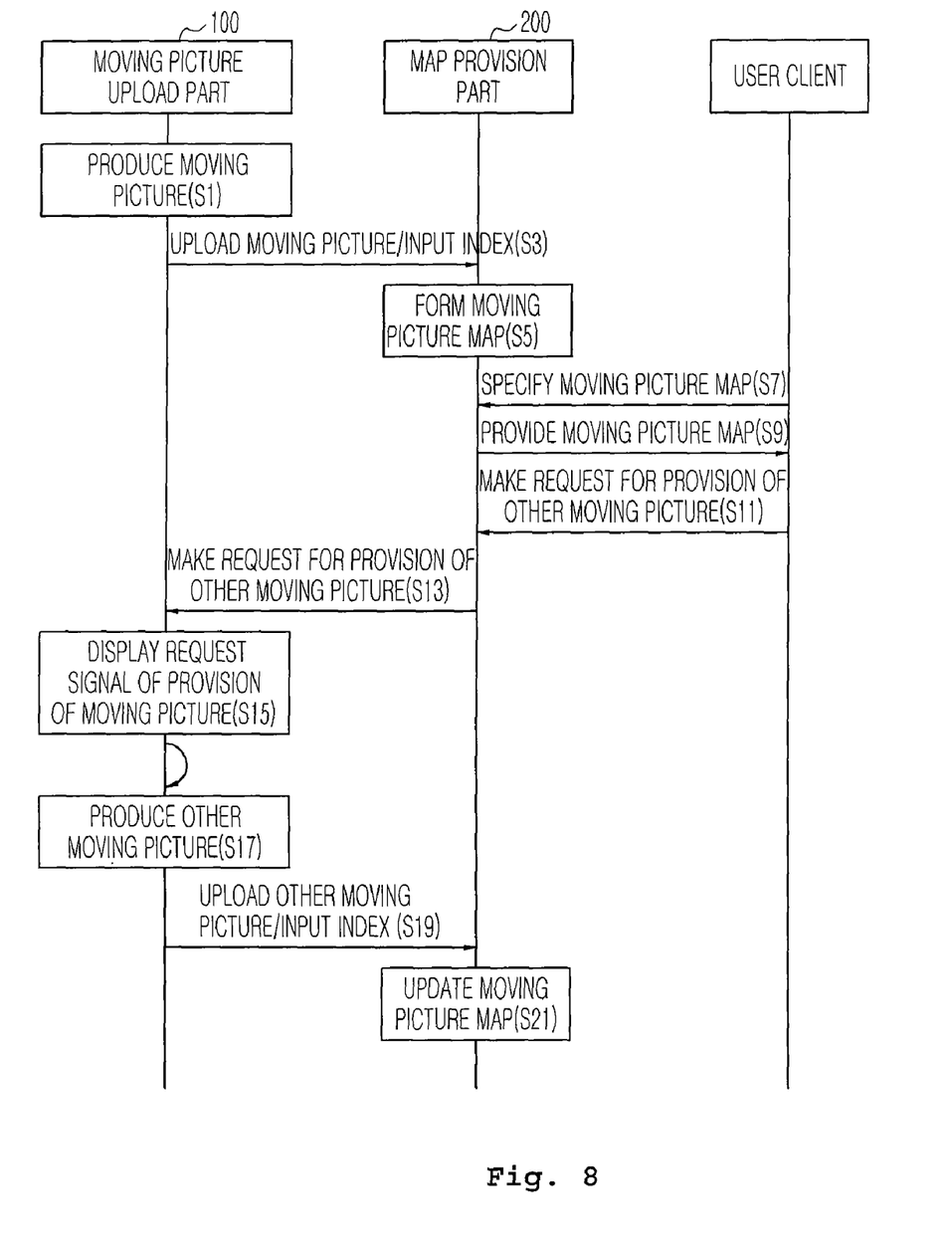
FIG. 8 is a flow chart illustrating an operation process of the system for providing a moving picture map shown in FIG. 1.

FIG. 8 is a flow chart illustrating an operation process of the system for providing the moving picture map shown in FIG. 1. As shown as an example in FIG. 8, in the method for providing a moving picture map, a predetermined moving picture is produced either through a separate space of an offline shop review zone or through an individual computer of each user (S1), and then the produced moving picture is delivered from the moving picture upload part 100 to the map provision part 200 (S3).

Preferably, in step S3, the moving picture is uploaded simultaneously while an index showing the subject matter of the uploaded moving picture is input.

Thereafter, the map provision part 200 distinguishes relations to other moving pictures having been already uploaded, based on the uploaded moving picture and a corresponding index, and forms a moving picture map according to a result of the distinction (S5).

Any one user client accesses the server for providing a moving picture map through a web or a wap access to specify a camera of a specific model (S7), and then receives and retrieves a moving picture map for the specified camera (S8).

When a result of retrieval shows that there is no desired moving picture, it is possible to make a request for provision of the desired moving picture (S11). Then, the map provision part 200 displays the indication that contains 'request for provision of a moving picture' on the user interface, in response to the request for provision of the moving picture of the user client (S13). Alternatively, the map provision part 200 displays the indication containing 'request for provision of a moving picture' on a corresponding monitor provided within each section of the space, when the moving picture upload part 100 is implemented through the space named an offline shop review zone (S15).

When any other user produces a corresponding moving picture in response to the request for provision of the moving picture (S17), the moving picture upload part 100 uploads the moving picture produced in step S17 while inputting a corresponding index (S19).

Thereafter, the map provision part 200 updates a moving picture map, in response to the added moving picture (S21).

Industrial Applicability

According to the present invention, it is possible for a user to easily find a moving picture of desired subject matter, by classifying moving pictures according to subject matter and spreading out the classified moving picture on a screen.

Although several exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A system for providing a moving picture map, the system comprising:
    a moving picture upload part for uploading moving pictures for one or more objects; and
    a map provision part for forming a moving picture map showing relations to other moving pictures according to subject matters, based on indexes corresponding to the moving pictures, and providing the moving picture map to a user interface for a moving picture search, the map provision part including a map forming unit,
    wherein the map forming unit automatically sets the indexes according to an upload area that a user specifies in the moving picture map displayed on the user interface, or sets the indexes according to texts input by a user,
    wherein, in the case of automatically setting the indexes, the map forming unit sets moving picture subject matter located at the upload area as the index when other moving pictures associated with each other within the upload area to be uploaded with the moving pictures have no sub-moving picture subject matter subordinate to the moving picture subject matter.

2. The system as claimed in claim 1, wherein the moving picture map is implemented for any one of said one or more objects, or is implemented for comparison between at least two objects.

3. The system as claimed in claim 1, wherein the moving picture corresponds to object information that has a manual describing the object according to each subject matter or the contents of a review about the object, and corresponds to object comparison information that compares objects when the moving picture is related to at least two objects of said one or more objects.

4. A server for providing a moving picture map, the server comprising:
    a reception unit for receiving uploaded moving pictures for one or more objects;
    a storage unit for storing the moving pictures;
    a map forming unit for forming a moving picture map showing relations to other moving pictures according to subject matters, based on indexes of the moving pictures; and
    a user interface unit for providing the moving picture map to a user interface for a moving picture search,
    wherein the map forming unit automatically sets the indexes according to an upload area that the user specifies in the moving picture map displayed on the user interface, or sets the indexes according to texts input by the user,
    wherein, in the case of automatically setting the indexes, the map forming unit sets moving picture subject matter located at the upload area as the index when other moving pictures associated with each other within the upload area to be uploaded with the moving pictures have no sub-moving picture subject matter subordinate to the moving picture subject matter.

5. The server as claimed in claim 4, wherein the map forming unit forms the moving picture map in accordance with any one of said one or more objects, or forms the moving picture map in accordance with comparison between at least two objects of said one or more objects.

6. The server as claimed in claim 4, wherein the user interface unit comprises:
    an object specification module for specifying any one of said one or more objects, and then specifying the moving picture map in accordance with the specified object; and
    a map display module for displaying the moving picture map on a web or wap page.

7. The server as claimed in claim 6, wherein the user interface unit further comprises an object comparison module for specifying at least two objects, which correspond to targets of mutual comparison, of said one or more objects, and then specifying the moving picture map in accordance with the specified objects.

8. The server as claimed in claim 6, wherein the user interface unit further comprises a moving picture display module for displaying the moving picture linked in accordance with any one index that a user specifies in the moving picture map.

9. The server as claimed in claim 8, wherein the user interface unit further comprises an object evaluation module for reflecting a user's evaluation on the moving picture.

10. The server as claimed in claim 6, wherein the user interface unit further comprises a moving picture request module for allowing a user to request the other moving pictures about the object.

11. The server as claimed in claim 10, wherein the moving picture request module adds a reply or a comment to the request through the user input.

12. The server as claimed in claim 6, wherein the map display module performs screen movement for the moving picture map, executes one of screen enlargement and screen reduction for the moving picture map, or shifts the moving picture map in two dimensions or three dimensions, according to a user's control of the screen.

13. The server as claimed in claim 6, wherein the map display module retrieves the indexes corresponding to keywords input by a user in the moving picture map.

14. The server as claimed in claim 6, wherein the map display module changes texts constituting the indexes in accordance with user's change setting of subject matter for any one index in the moving picture map.

15. The server as claimed in claim 6, wherein the map display module allows other users beside a user uploading the moving picture to perform editing including deletion for any one moving picture when the moving picture constituting the moving picture map satisfies a pre-set condition for sharing editing.

16. A system for uploading moving pictures, the system comprising:
    a monitor unit for displaying a moving picture map formed by collecting a first moving picture for one or more objects;
    a moving picture producing unit for responding to a request for provision of a moving picture displayed on the monitor unit, or forming a second moving picture according to optional production and execution of a user; and
    an upload unit for uploading the second moving picture onto a server for providing a moving picture map to update the moving picture map,
    wherein the sever includes a map forming unit that automatically sets the indexes according to an upload area that the user specifies in the moving picture map displayed on the user interface, or sets the indexes according to texts input by the user,
    wherein, in the case of automatically setting the indexes, the map forming unit sets moving picture subject matter located at the upload area as the index when other moving pictures associated with each other within the upload area to be uploaded with the moving pictures have no sub-moving picture subject matter subordinate to the moving picture subject matter.

17. The system as claimed in claim 16, further comprising a user computer unit for producing and uploading the second moving picture in an individual zone of the user.

18. A method for providing a moving picture map, the method comprising the steps of:
    uploading moving pictures for one or more objects;
    forming a moving picture map showing relations to other moving pictures according to subject matters, based on indexes corresponding to the moving pictures; and
    providing the moving picture map to a user interface for a moving picture search, the map provision part including a map forming unit,
    wherein the map forming unit automatically sets the indexes according to an upload area that the user specifies in the moving picture map displayed on the user interface, or sets the indexes according to texts input by the user,
    wherein, in the case of automatically setting the indexes, the map forming unit sets moving picture subject matter located at the upload area as the index when other moving pictures associated with each other within the upload area to be uploaded with the moving pictures have no sub-moving picture subject matter subordinate to the moving picture subject matter.

19. The method as claimed in claim 18, further comprising a step of updating the moving picture map either by updating other moving pictures, or by correcting the moving picture map.

20. A system for providing a moving picture map, the system comprising:
    a moving picture upload part for uploading moving pictures for one or more objects; and
    a map provision part for forming a moving picture map showing relations to other moving pictures according to subject matters, based on indexes corresponding to the moving pictures, and providing the moving picture map to a user interface for a moving picture search, the map provision part including a map forming unit,
    wherein the map forming unit automatically sets the indexes according to an upload area that a user specifies in the moving picture map displayed on the user interface, or sets the indexes according to texts input by a user,
    wherein the map forming unit sets texts input by a user as the indexes, when other moving pictures associated with each other within the upload area to be uploaded with the moving pictures have a sub-moving picture subject matter subordinate to the moving picture subject matter.

21. A server for providing a moving picture map, the server comprising:
    a reception unit for receiving uploaded moving pictures for one or more objects;
    a storage unit for storing the moving pictures;
    a map forming unit for forming a moving picture map showing relations to other moving pictures according to subject matters, based on indexes of the moving pictures; and
    a user interface unit for providing the moving picture map to a user interface for a moving picture search,
    wherein the map forming unit automatically sets the indexes according to an upload area that the user specifies in the moving picture map displayed on the user interface, or sets the indexes according to texts input by the user,
    wherein the map forming unit sets texts input by a user as the indexes, when other moving pictures associated with each other within the upload area to be uploaded with the moving pictures have a sub-moving picture subject matter subordinate to the moving picture subject matter.

22. A system for uploading moving pictures, the system comprising:
    a monitor unit for displaying a moving picture map formed by collecting a first moving picture for one or more objects;
    a moving picture producing unit for responding to a request for provision of a moving picture displayed on the monitor unit, or forming a second moving picture according to optional production and execution of a user; and
    an upload unit for uploading the second moving picture onto a server for providing a moving picture map to update the moving picture map,
    wherein the sever includes a map forming unit that automatically sets the indexes according to an upload area that the user specifies in the moving picture map displayed on the user interface, or sets the indexes according to texts input by the user,
    wherein the map forming unit sets texts input by a user as the indexes, when other moving pictures associated with each other within the upload area to be uploaded with the moving pictures have a sub-moving picture subject matter subordinate to the moving picture subject matter.

23. A method for providing a moving picture map, the method comprising the steps of:
    uploading moving pictures for one or more objects;
    forming a moving picture map showing relations to other moving pictures according to subject matters, based on indexes corresponding to the moving pictures; and
    providing the moving picture map to a user interface for a moving picture search, the map provision part including a map forming unit,
    wherein the map forming unit automatically sets the indexes according to an upload area that the user specifies in the moving picture map displayed on the user interface, or sets the indexes according to texts input by the user,
    wherein the map forming unit sets texts input by a user as the indexes, when other moving pictures associated with each other within the upload area to be uploaded with the moving pictures have a sub-moving picture subject matter subordinate to the moving picture subject matter.

* * * * *